Oct. 11, 1960 P. W. REED 2,956,257

ELECTRICAL MODULE ASSEMBLY

Filed July 15, 1955 2 Sheets-Sheet 1

INVENTOR
PAUL W. REED

BY Nort, Shidds & Price

ATTORNEY

Oct. 11, 1960 P. W. REED 2,956,257

ELECTRICAL MODULE ASSEMBLY

Filed July 15, 1955

2 Sheets-Sheet 2

INVENTOR.
Paul W. Reed
BY Hart, Snidder & Price
Attorneys

United States Patent Office 2,956,257

Patented Oct. 11, 1960

2,956,257

ELECTRICAL MODULE ASSEMBLY

Paul W. Reed, Greenbelt, Md., assignor, by mesne assignments, to Illinois Tool Works, Chicago, Ill., a corporation of Illinois Filed July 15, 1955, Ser. No. 522,339

7 Claims. (Cl. 339—17)

This invention relates to an electrical assembly and more particularly to an assembly wherein a variety of circuitry components are secured to a panel.

The modular technique has been developed to effect economies in circuit production whereby all components of a particular stage in a multi-stage circuit are arranged on a module. The module comprises a series of layers of wafers connected together with conductive perpendicular risers disposed in piercing relations at the edges thereof and secured thereto. Thus a three-dimensional unit is provided which will carry the several circuit components properly connected into a printed circuit panel.

Methods have been developed for mounting these module units onto panels but a difficulty has been experienced in the determination of the proper distribution of the module with relation to the panel member. It has been found that the most desirable configuration is obtained both from an economy of space view point and a servicing veiw point if the module body is placed on one side of the panel and a tube socket is placed on the other side thereof. However, this arrangement leads to difficulties when automatic assembly of the units is attempted and when a conventional round tube socket is thus joined with a module for connection to a panel carrying printed circuitry many difficulties have been experienced because of the lack of physical strength of the socket and the troubles experienced in properly orienting the automatic machinery for performing the actual mechanical connection of the module stack. The instant invention discloses a solution to this problem wherein a tube socket of noncircular configuration is mounted on the superior wafer of the module wafer stack and is disposed to pass through an aperture formed in a panel whereby the combined tube socket and module are firmly secured to the panel with the axis of the socket being substantially coincident with the axis of symmetry of the aperture formed in the panel.

It is accordingly a broad object of the invention to improve on the socket and module assemblies now in use.

It is another object of the invention to provide a vacuum tube socket of novel configuration that readily lends itself for module mounting by automatic machinery.

Other objects and advantages will be in part explained and in part obvious from the following description in which.

Figure 1:
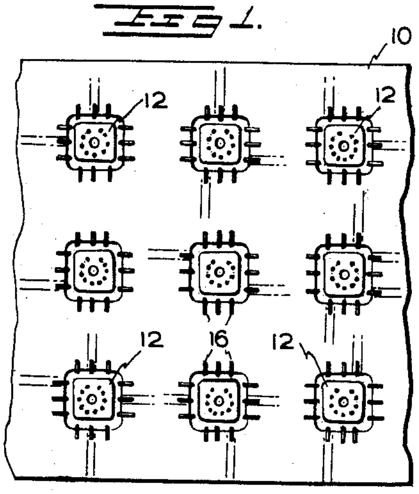
Figure 1 is a top plan view of a plurality of modules mounted on a panel in accordance with the present invention.

Referring now to the drawing, wherein like parts are designated by like reference characters, a panel member 10 is shown in Figure 1 carrying a plurality of socket mounted modules. This embodiment is to show what is intended to be the final form of a complex electronic circuit, each disclosed socket and module representing a complete stage constructed in accordance with this invention.

Figure 2:
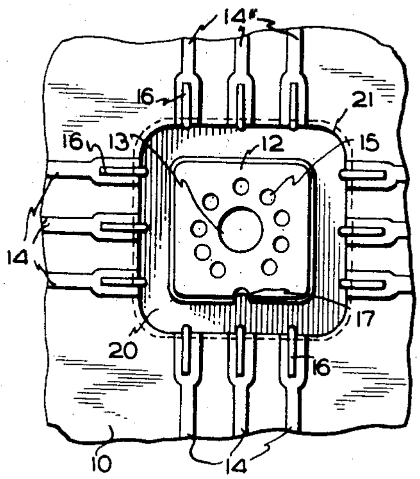
Figure 2 is an enlarged fragmentary top plan view of a single module secured to a planar member carrying printed circuitry thereon.

In Figure 2 the printed circuitry is shown as reference character 14 and a square aperture 21 is formed in the panel to receive a socket 12. It will be noted that the edges of the aperture serve to interrupt the several conductors carried on the panel. As is seen in Figure 2, socket 12 may be of substantially square configuration with the area of the top surface formed to be slightly smaller than the area of the bottom surface to thereby provide a slightly tapering elevation. A hole 13 is formed in the center of the socket to receive a shield member and the usual pin contacts 15 are arranged circumferentially about the guide hole. Obviously any number of pin contacts may be provided but for purposes of illustration a nine contact socket is shown.

Figures 3, 4, 5:
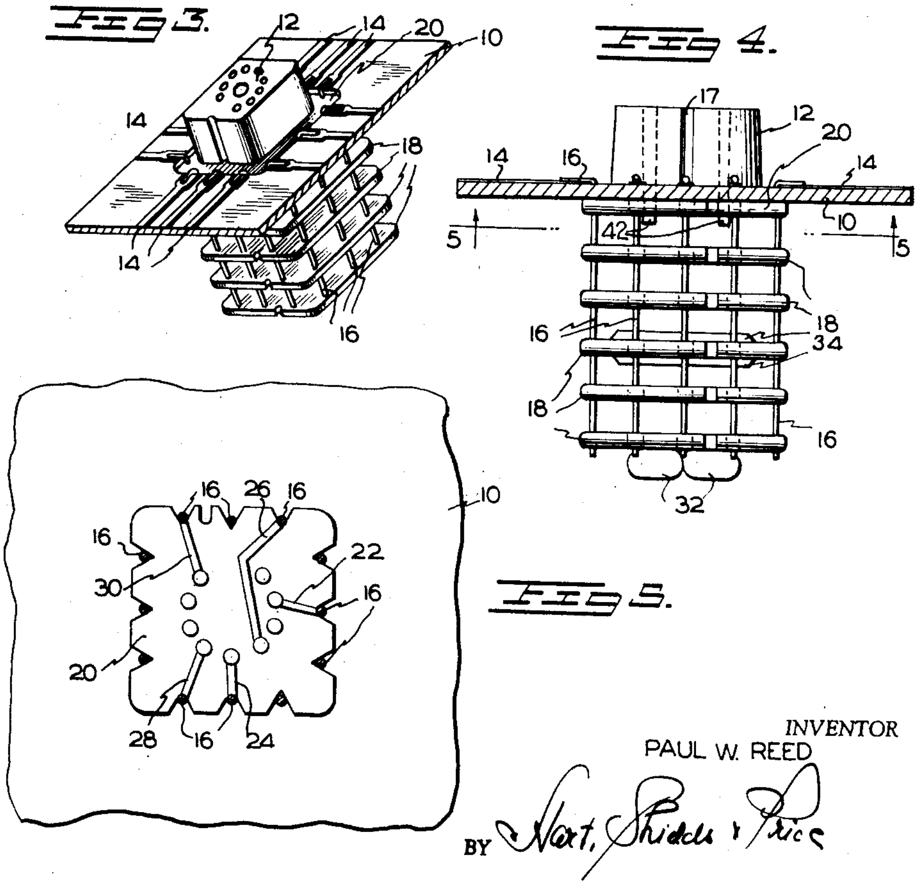
Figure 3 is a perspective view of the module shown in Figure 2.
Figure 4 is a side elevational view of the module shown in Figures 2 and 3.
Figure 5 is a detailed sectional view taken along lines 5—5 of Figure 4 and looking in the direction of the arrows.

The module, per se, as best seen in the perspective view of Figure 3 comprises a plurality of wafer members, 18, arranged in spaced parallel disposition and having an assemblage of metal risers 16 disposed in piercing relationship around the outer circumference thereof. The risers are made from a metal of good electrical conductivity and extend upward through the aperture 21 to be bent back upon themselves, substantially as shown, to engage the outwardly flaring terminal portions of the interrupted circuitry 14. The wafers 18 are arranged to carry electrical components as is illustrated in Figure 4. Reference character 32 indicates a group of condensers firmly fixed to the lowest wafer; and resistors 34 are shown mounted on the upper and lower surfaces of the middle wafer. The superior wafer 20 which engages in abutting relation the panel member 10 carries thereon the beforementioned socket 12. The socket contact pins extend through the wafer as will later be described and are terminated on the other side as is seen in Figure 5. Printed circuitry on this side of the superior wafer interconnects the socket contact pins with the conductive risers 16 substantially as shown. The module represents a complete stage in an electronic circuit; as an illustration, the connections for a 6SA4 tube have been shown. Reference character 22 indicates a printed path interconnecting the number 2 pin, or cathode, to an appropriate conductive riser; number 4 pin, which connects with one of the heaters, is connected to a riser by printed path 26; pin number 5, which is the other end of the heater is connected to a riser by printed path 24; pin number 6, which is the grid connection, is connected to a riser by path 28 and pin number 9, which is the plate terminal, is connected to a riser by path 30. It is thus readily seen that when the proper circuit parameters are carried by the several wafer members and interconnected with the tube pins through the risers, the module assembly represents a complete stage of an electronic circuit. Obviously the wafer printed circuitry may be used to connect directly between socket contacts when such connection is required for tube electrode interconnection.

Figure 6:
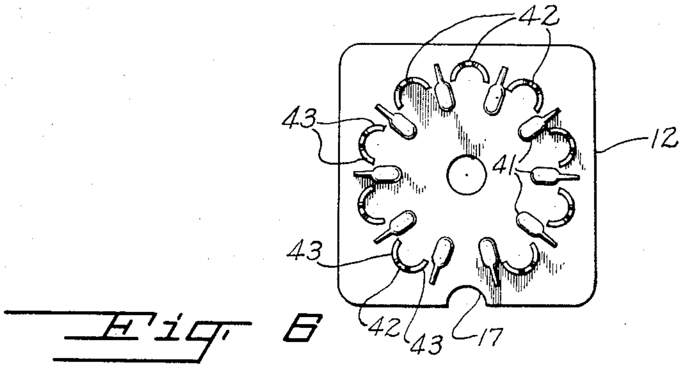
Figure 6 is an enlarged bottom plan detail view of the socket of Figures 2, 3 and 4.
Figure 7:
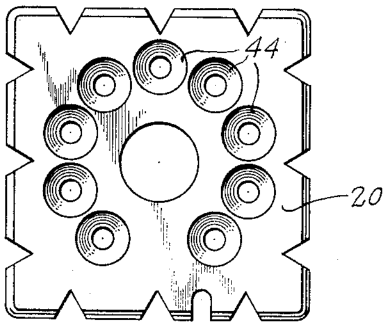
Figure 7 is an enlarged top plan detail view of the module end-wafer of Figure 4.

The beforementioned socket 12 has formed therein a guide groove 17 for the purpose of orienting the socket during the assembly thereof and for ready identification of the contact pins. As can be seen by reference to Figures 6 and 8, the socket contacts extend outwardly from the bottom of the socket between insulation lands 41 and are formed to have the extreme terminal portions 42 of a reduced dimension. Since the contacts are shaped into a generally arcuate configuration in plan (Figure 6), two inclined surfaces 43 are thereby formed.

Figure 8:
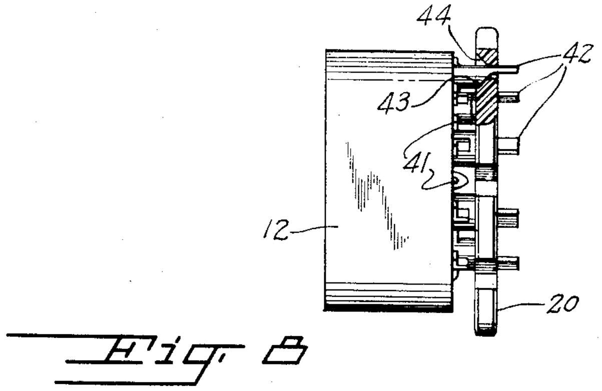
Figure 8 is an enlarged side elevation detail, partly in section showing the socket and wafer assembly.

Superior wafer 20 has provided thereon a plurality of upwardly flaring bores 44 to receive in penetrating relationship the socket contacts. As is best seen in Figure 8, when the socket is assembled into the wafer the inclined surfaces 43 engage against the tapering sides of the respective bores to thereby receive the downward thrust of tube pins interfitting into the socket. The socket terminal portions 42 are bent back in final assembled position to lie against the wafer and to contact the conductive paths printed thereon which are soldered thereto. It is readily seen that the downward tube thrust is not transmitted to the relatively structurally weak connection between the terminal portions and the conductive paths but is received by the wafer itself and reaction thereto is supplied by the riser wires.

The disclosed embodiment readily lends itself to fabrication by automatic machinery, which is the subject matter of certain other applications. The socket is firmly secured to the superior wafer as previously described and in final assembly position, as seen in Figure 2, defines equal areas between its sides and the edges of the aperture whereby the axis of the socket is coincident with the axis of symmetry of the aperture.

A square configuration of the tube socket allows the same size socket for 7 and 9 pin tubes without wasting material, and permits the handling of both sockets by the same automatic machine. The disclosed square body provides the maximum strength for the minimum volume and space required within the aperture formed in the panel. The additional material at the corners of the socket provides the structural strength necessary to withstand the impact imparted by machine handling when the module socket and assemblies are being mounted on the panel. The symmetrically square shape and the groove greatly simplified the orientation of the socket for assembly purposes by automatic machinery and the tapering of the socket, whereby the top area is less than the bottom, provides the guide for the riser handling tool in the final assembly process. It will be understood, however, that the tube socket may be of any noncircular configuration.

While I have described an embodiment of my invention, other variations in detail will readily occur to those skilled in the art and accordingly it is understood that the described embodiment is illustrative only and not to be construed in a limiting sense.

I claim:

1. In an electrical assembly the combination comprising a stack of relatively thin wafers fixed in spaced planes, electrical components supported on some of said wafers, a plurality of conductive strands engaged to each respective wafer at the outer extremities thereof and forming a right angle therewith, conductive paths formed on at least some of said wafers to interconnect between selected component terminals and between component terminals and strands, a socket carried on the superior wafer of said stack, and a plurality of flaring bores countersunk in the superior wafer to receive the respective socket terminals, the terminals being of such longitudinal dimension as to extend through said bores and bent against the wafer to engage conductive paths formed thereon.

2. In an electrical assembly the combination comprising a stack of relatively thin wafers fixed in spaced planes, a plurality of conductive risers secured in the peripheries of said wafers and forming a right angle therewith, a tube socket carried on the top wafer of said stack, a plurality of upwardly flaring bores countersunk in the top wafer to receive the respective terminals of said socket, the terminals being of such longitudinal dimension as to extend through said bores and bent against the wafer and of such axial configuration as to engage in part at least against the bore walls below the surface of the wafer, and conductive paths formed on the top wafer to connect with selected socket terminals.

3. An electrical assembly comprising a planar member, conductors on said member, said member having an aperture formed therein interrupting selected ones of the conductors, a module secured to said member and covering said aperture, said module comprising a stack of wafers fixed in spaced planes parallel to said member and a plurality of conductive risers secured to said wafers at the peripheries thereof and extending through said aperture, said risers interlocking with said member and engaging said selected conductors, a socket supported by the one wafer of said module next to said planar member, said socket extending through said aperture, contacts mounted on said socket and extending therefrom, said one wafer having a plurality of upwardly flaring bores receiving the respective ends of said contacts, said contacts having sides formed to engage the bore walls below the surface of the said one wafer at portions of reduced diameter thereof, and conductive paths on said one wafer interconnecting said contacts with said risers.

4. An electrical assembly comprising a relatively thin wafer adapted to support electrical components, a socket having a plurality of contacts mounted thereon and extending therefrom, said wafer having a plurality of bores formed with flaring walls and including wall portions of reduced diameter for receiving respective ones of said contacts, said socket spaced from said wafer with said contacts extending through said bores and having their ends bent against the side of said wafer remote from said socket, said contacts having abutment shoulders engaging said flaring bore walls below the surface of said wafer at said portions of reduced diameter thereof, and conductive paths on said side of said wafer remote from said socket connected to said contact ends.

5. An electrical assembly comprising a planar member, conductors on said member, said member having a square aperture formed therein interrupting selected ones of said conductors, a module secured to said member to cover said aperture, said module comprising a stack of wafers fixed in spaced planes parallel to said member, a plurality of conductive risers secured to said wafers at the peripheries thereof and extending through said aperture to engage the interrupted conductors, a square socket carried on one side of the superior wafer of said module and extending through said aperture, socket contacts mounted on and projecting from said socket, a plurality of countersunk bores in said superior wafer to receive the respective ends of said socket contacts, and conductive paths on the other side of said superior wafer interconnecting the socket contacts with said risers.

6. In an electrical assembly, the combination comprising a planar member, conductors on said member, said member having a plurality of apertures formed therein to interrupt selected conductors, a plurality of modules secured to said member at the respective apertures to cover the same, each said module comprising a stack of wafers fixed in spaced planes parallel to said member, a plurality of conductive risers secured to said wafers at the peripheries thereof and extending through said aperture to interlock with said member and to engage the interrupted conductors, a socket having a plurality of contacts carried on the superior wafer of each said module, each said superior wafer having a plurality of flaring bores therein to receive the contacts, the center of symmetry of said socket being substantially coincident with the center of symmetry of said aperture to define equal areas therebetween, and conductive paths on said superior wafer to interconnect between respective socket contacts and risers.

7. An electrical assembly comprising in combination a planar member, a tube socket, a plurality of terminals mounted in and projecting from said socket, a plurality of bores in said member for receiving said terminals, the walls defining said bores having a first portion of a first dimension and a countersunk second portion of a larger dimension, said socket spaced from said planar member with said terminals each extending into a different one of said bores, said terminals having abutment shoulders engaging said countersunk second portion bore walls, the ends of said terminals being bent against said member on the side thereof remote from said socket, and conductive paths on said side of said member remote from said socket connected to said terminal ends.

References Cited in the file of this patent

UNITED STATES PATENTS

| | | |
|---|---|---|
| 2,359,634 | Franklin | Oct. 3, 1944 |
| 2,613,244 | Del Camp | Oct. 7, 1952 |
| 2,683,839 | Beck | July 13, 1954 |
| 2,757,349 | Erbal | July 31, 1956 |
| 2,760,176 | Del Camp | Aug. 21, 1956 |
| 2,863,131 | Carlzen et al. | Dec. 2, 1958 |

OTHER REFERENCES

N. B. S. Electrical Mfg., November 1953, pages 157, 158.